(12) United States Patent
Skärby et al.

(10) Patent No.: US 9,603,050 B2
(45) Date of Patent: Mar. 21, 2017

(54) METHOD AND BASE STATION FOR CONTROLLING WIRELESS COMMUNICATION OF DATA

(75) Inventors: Christian Skärby, Stockholm (SE); Gunnar Bergquist, Kista (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 374 days.

(21) Appl. No.: 14/379,962

(22) PCT Filed: Feb. 22, 2012

(86) PCT No.: PCT/SE2012/050199
§ 371 (c)(1),
(2), (4) Date: Aug. 20, 2014

(87) PCT Pub. No.: WO2013/125996
PCT Pub. Date: Aug. 29, 2013

(65) Prior Publication Data
US 2015/0055472 A1     Feb. 26, 2015

(51) Int. Cl.
*H04W 28/02*     (2009.01)
*H04W 28/10*     (2009.01)
*H04L 12/801*    (2013.01)

(52) U.S. Cl.
CPC ......... *H04W 28/0289* (2013.01); *H04L 47/12* (2013.01); *H04W 28/0236* (2013.01); *H04W 28/10* (2013.01)

(58) Field of Classification Search
CPC ......... H04W 28/0289; H04W 28/0236; H04W 28/10; H04L 47/12
See application file for complete search history.

(56) References Cited

U.S. PATENT DOCUMENTS

| | | | |
|---|---|---|---|
| 2006/0171396 A1 | 8/2006 | Singh et al. | |
| 2012/0033554 A1* | 2/2012 | Shiva | H04W 28/0205 370/235 |
| 2014/0198643 A1* | 7/2014 | Conway | H04W 24/08 370/230 |

OTHER PUBLICATIONS

Larmo, Anna et al., "The LTE Link-Layer Design", LTE Part II: 3GPP Release 8, IEEE Communications Magazine, Apr. 2009, pp. 52-59.

(Continued)

*Primary Examiner* — Melvin Marcelo
(74) *Attorney, Agent, or Firm* — Murphy, Bilak & Homiller, PLLC

(57) ABSTRACT

A method and a base station (900) for controlling wireless communication of data on a first radio link between the base station and a User Equipment, UE (902), when a first communication Mode is employed implying that corresponding status reports should be transmitted on an opposite second radio link to indicate whether said data has been received or not. A communication unit (900a) communicates data and status reports with the UE according to the first communication Mode and according to a second communication Mode. When an indication of potential congestion pertaining to the second radio link is detected, a logic unit (900b) instruct the communication unit to trigger or initiate a change to a second communication Mode implying that no transmission of status reports on the second radio link is expected. Thereby, any unnecessary re-transmissions of data due to missing status reports may be avoided.

18 Claims, 5 Drawing Sheets

(56) References Cited

OTHER PUBLICATIONS

Unknown, Author, "Unsupported RLC Mode Reconfigurations", 3GPP TSG-RAN 2 Meeting #46, Tdoc R2-050613, Qualcomm Europe, Scottsdale, Arizona, USA, Feb. 14-18, 2005, pp. 1-4.

* cited by examiner

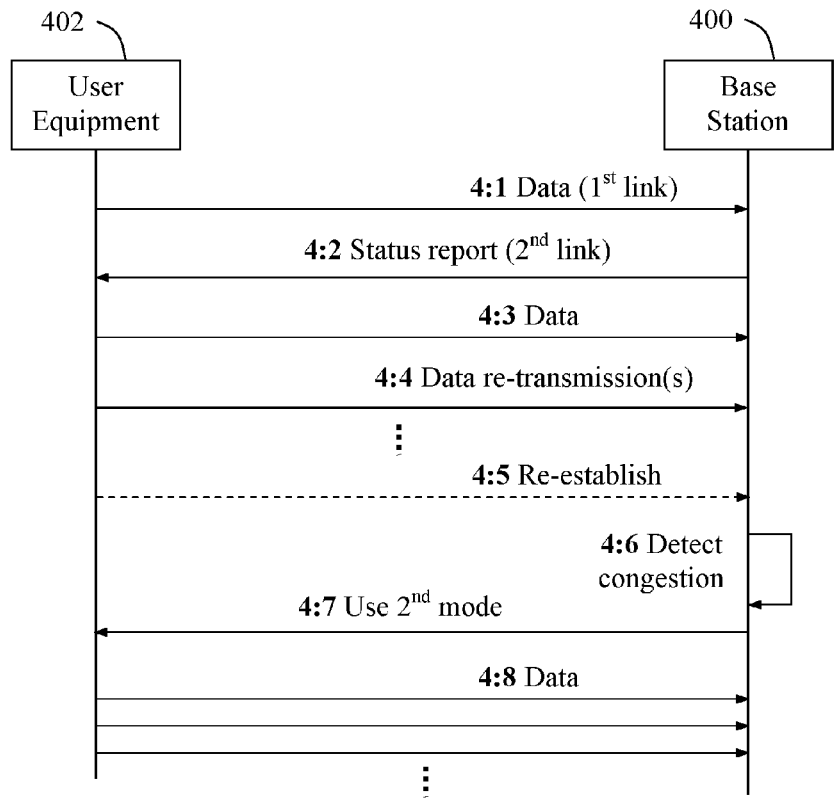
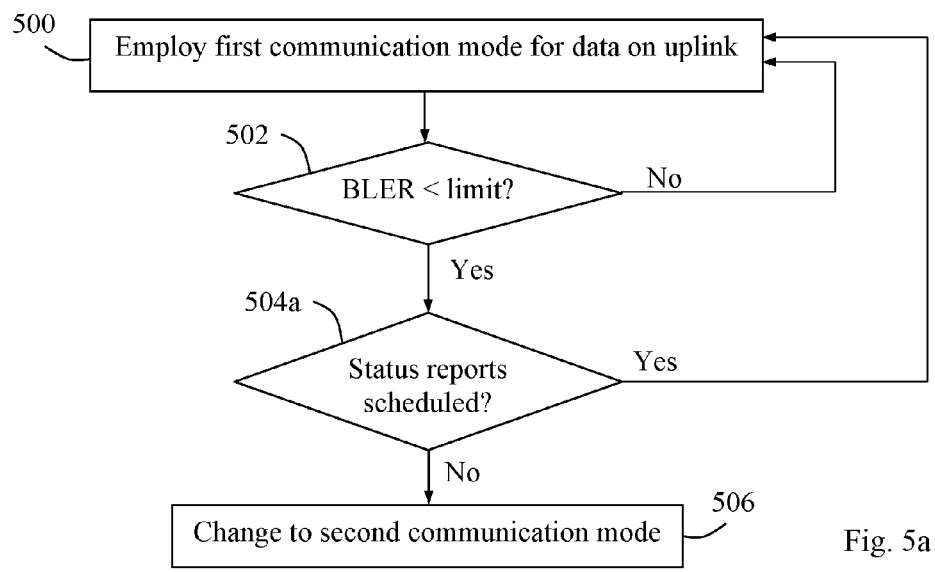
Fig. 4
Fig. 5a

– 1 –

METHOD AND BASE STATION FOR CONTROLLING WIRELESS COMMUNICATION OF DATA

TECHNICAL FIELD

The present disclosure relates generally to a method and a base station for controlling wireless communication of data on a first radio link between the base station and a User Equipment, UE.

BACKGROUND

When data is communicated between a base station of a wireless communication network and a User Equipment (UE) served by the base station, a Radio Link Control (RLC) protocol can be applied as a sub-layer of Layer 2 for handling this data communication, which has been specified by the Third Generation Partnership Project (3GPP). RLC is typically implemented by using data receiving and transmitting RLC entities in both the base station and the UE. The RLC entities are configured to exchange data in the form of Service Data Units (SDUs) of a higher layer over a logical channel configured by the so-called Radio Resource Control (RRC) layer. On a lower layer called the Medium Access Control (MAC) layer, such logical channels are mapped to transport channels where the data is communicated in the form of data blocks, which communication is controlled by a so-called MAC-scheduler.

At the RLC level, an SDU may further be segmented into multiple smaller chunks of data, referred to as Protocol data Units (PDUs), before transmission, which are put together again at the receiving side. Depending on the communication service used and/or current traffic situation, it may be required that reception of the transmitted PDUs is confirmed by means of PDU status reports sent from the data receiving RLC entity in one node to the data transmitting RLC entity in an opposite node. This can be applied for both downlink and uplink communication of data. If a status report indicates that a PDU has not been received properly, or if no status report has been received at all for that PDU, the data transmitting RLC entity is typically configured to re-transmit the same PDU, which may be repeated a number of times e.g. until a status report is received from the data receiving RLC entity indicating that the PDU has been received properly.

The RLC entities can be configured to apply different communication modes referred to as Transparent Mode (TM), Unacknowledged Mode (UM) and Acknowledged Mode (AM). Which mode to use for a session is decided by a radio bearer mapping function at the base station, typically based on the type of service used and possibly also on the available resources, and the selected mode is signalled from the base station to the UE at establishment of a radio bearer, referred to as "radio bearer setup".

In TM, the SDUs are communicated "as is" between the RLC entities in the base station and the UE and no additional processing or reception control is made whatsoever. In UM, the SDUs are first segmented into PDUs at the data sending RLC entity before transmission of the PDUs one by one, and the PDUs are then joined together to reassemble the SDUs again at the data receiving RLC entity. Thereby, the PDU size can be selected freely independent of the SDU size, providing flexibility to the lower layers. No status reporting is required or expected for UM and any PDU that has not been received properly will be missed or discarded at the receiving side.

In AM, PDUs are communicated as in UM but acknowledgement of reception of the PDUs is expected at the data receiving RLC entity in the form of the above-described PDU status reports, which is also referred to as Automatic Repeat reQuest (ARQ). It should be noted that the MAC layer typically also applies a similar acknowledgement mechanism called Hybrid ARQ (HARQ) to confirm reception of data blocks.

In FIG. 1, a base station 100 is schematically shown comprising a data receiving RLC entity 100a and a data transmitting RLC entity 100b. Further, a UE 102 served by base station 100 comprises a data receiving RLC entity 102a which can receive data, e.g. PDUs, from the data transmitting RLC entity 100b, and a data transmitting RLC entity 102b which can transmit data, e.g. PDUs, to the data receiving RLC entity 100a.

With this configuration, data in the form of PDUs may be sent on an uplink channel from the data transmitting RLC entity 102b to the data receiving RLC entity 100a. In that case, corresponding PDU status reports may be sent on an opposite downlink channel from the data receiving RLC entity 100a to the data transmitting RLC entity 102b, such as when the above AM is used, as shown in the figure. Correspondingly, PDUs may also be sent on a downlink channel from the data transmitting RLC entity 100b to the data receiving RLC entity 102a. In that case, PDU status reports may be sent on an opposite uplink channel from the data receiving RLC entity 102a to the data transmitting RLC entity 100b.

There are some drawbacks associated with the above AM RLC procedure. Since the ARQ process at RLC level must basically wait for the HARQ process at MAC level to be completed, the re-transmission process at RLC level takes considerably longer than the HARQ re-transmissions, which could delay the communication to a great extent especially if re-transmissions on the RLC layer occur frequently. Another difference is that in HARQ re-transmissions, the multiple transmissions of the same data block can be combined for decoding that data block at the receiver, using so-called soft combining, which is not employed for PDUs at the RLC level. In the latter case, all failed transmission attempts are thus of no use and a total waste of resources. As a result, the AM mode for RLC is selected only for delay-tolerant services.

A problem with the AM RLC procedure is that status reports sometimes do not arrive on time or not at all to the data transmitting node, resulting in re-transmission of the same data since that data has not been acknowledged by the data receiving node, at least as perceived by the data transmitting node. This situation may occur even when the data has in fact been conveyed and received successfully and the status reports have been sent but not delivered properly, for some reason.

Status reports can be delayed or missed repeatedly resulting in repeated re-transmissions of data. Eventually, it may even be determined that the current radio link used for data is apparently not good enough and must be torn down and replaced by a new radio link, which is a time-consuming and resource-demanding process. If the radio link for data was perfectly acceptable in spite of the missing status reports, the process of tearing down the link and setting up a new connection will be made unnecessarily. The delay of status reports, if required or expected, can thus lead to excessive re-transmissions of data which will cause increased load in the cell, delays and impaired quality of the communication as well as needless tear-down and re-establishment of radio link.

SUMMARY

It is an object of the invention to address at least some of the problems and issues outlined above. It is possible to achieve these objects and others by using a method and a base station as defined in the attached independent claims.

According to one aspect, a method is provided in a base station for controlling wireless communication of data on a first radio link between the base station and a User Equipment, when a first communication Mode is employed implying that reports on a status of the data communication should be transmitted on an opposite second radio link between the base station and the UE to indicate whether the data has been received or not. In this method, the base station detects an indication of potential congestion pertaining to the second radio link, and changes from the first communication Mode to a second communication Mode in response to the detection. The second communication Mode implies that no transmission of status reports on the second radio link is expected.

Thereby, no unnecessary re-transmissions of correctly conveyed and received data will be made due to undelivered status reports. Further, a radio link or connection which actually works well for conveying data properly between the base station and the UE, will not be eventually torn down due to such unnecessary re-transmissions. The time-consuming and resource-demanding process of establish a new connection, radio link or bearer between the base station and the UE can thus be avoided.

According to another aspect, a base station is configured to control wireless communication of data on a first radio link between the base station and a UE when a first communication Mode is employed implying that reports on a status of the data communication should be transmitted on an opposite second radio link between the base station and the UE to indicate whether the data has been received or not.

The base station comprises a communication unit adapted to communicate data and status reports with the UE according to the first communication Mode and according to a second communication Mode implying that no transmission of status reports on the second radio link is expected. The base station also comprises a logic unit adapted to detect an indication of potential congestion pertaining to the second radio link. The logic unit is further adapted to instruct the communication unit to trigger or initiate a change from the first communication Mode to the second communication Mode, in response to the detection.

The above method and base station may be configured and implemented according to different optional embodiments. In one possible embodiment, when the first radio link is used for uplink transmission of data and the second radio link is used for downlink transmission of status reports, the congestion indication may be detected when a block error rate BLER on the second radio link is below a limit, and when no status reports have been scheduled for the UE during a certain time period or the UE has made a link re-establishment request.

In another possible embodiment, when the first radio link is used for downlink transmission of data and the second radio link is used for uplink transmission of status reports, the congestion indication may be detected when no status reports are received from the UE on the second radio link in due time. In this case, a timer may be started in the base station when sending data that triggers status reporting. The congestion indication is then detected when the timer expires before receiving any status reports from the UE.

In further possible embodiments, the congestion indication may be detected when data has been re-transmitted on the first radio link more than a certain number of times, or when the level of resource usage for one or more radio bearers on the second radio link exceeds a first threshold. In the latter case, the base station may change from the second communication Mode back to the first communication Mode when the level of resource usage falls below a second threshold that is lower than the first threshold.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which:

FIG. 4 is a signalling diagram illustrating an example of a communication between a UE and a base station when the solution is used, according to further possible embodiments.

FIGS. 5a, 5b, 6, 7 and 8 are flow charts illustrating some different examples of how the solution may be employed in practice, according to further possible embodiments.

DETAILED DESCRIPTION

Figure 1:
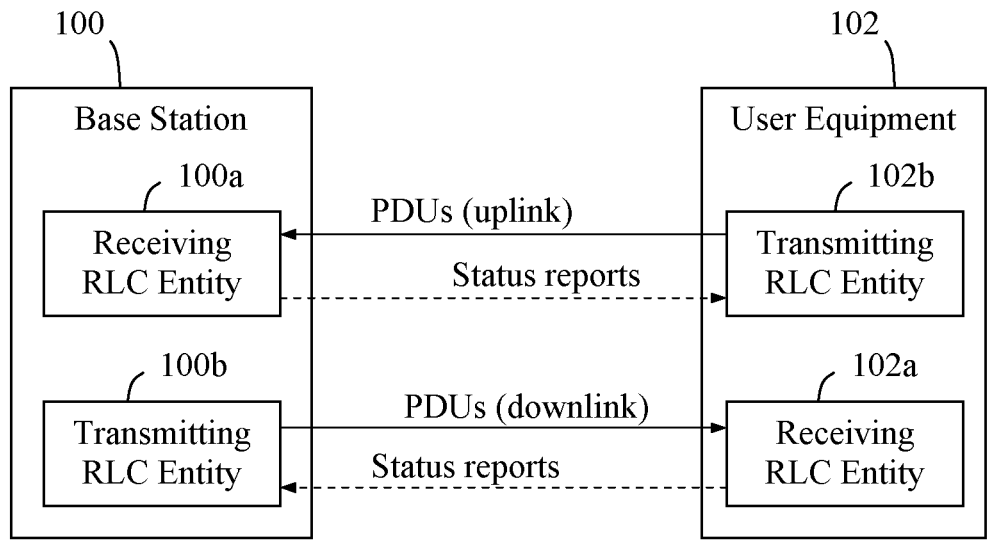
FIG. 1 is a block diagram illustrating a base station and a UE, both capable of using Radio Link Control, RLC, for data communication, according to the prior art.

In this solution, it has been recognized that delay or absence of required or expected status reports may be caused by congestion on the radio link used for status reporting, while the radio link used for data transmission may work properly such that the data is actually conveyed to the receiving node such that positive status reports are warranted. However, the data transmitting node will not be aware of this due to the delayed or missing status reports. This situation can occur both for uplink and downlink communication of data between a base station and a UE.

Due to the mostly asymmetric nature of packet-based communications typically used today, the load on uplink resources and downlink resources can be very different from each other in a cell served by the base station. For example, when several UEs in the cell are currently downloading large amounts of media, the data traffic can be quite dense in the downlink while very little data is transmitted from the UEs to the base station on the uplink. Any status reports that should be sent on the downlink in the cell, referring to data transmitted from a UE on the uplink, may therefore be delayed or missed due to the dense downlink traffic such that the UE will accordingly re-transmit the data if AM is used whenever a status report has not arrived in due time.

Thus, when data is transmitted without problems on a first radio link between a base station and a UE, an opposite second radio link used for status reporting for the data may be congested such that the status reports cannot be delivered in due time or not at all, even if the data has in fact been properly conveyed and received on the non-congested first radio link. The resulting re-transmissions will thus be made merely because no status reports has arrived on time even though the data itself has been conveyed and received properly. The data will thus be re-transmitted unnecessarily and the data receiving node will therefore simply discard the re-transmitted data.

After repeated re-transmissions, the data transmitting node may, as mentioned above, even conclude that the first radio link is not good enough for further use since it apparently cannot convey the data properly, which may be implied after a maximum number of re-transmissions has been reached. The data transmitting node may then initiate so-called Radio Link Failure (RLF), meaning that the connection is torn down, even when the first radio link is quite useful itself. Thereafter, a new connection must be established involving a new radio bearer setup procedure which is both time-consuming and resource-demanding. The signalling involved back and forth may cause further congestion on the second radio link such that a "snow-balling" effect may arise.

An example of how this situation may occur in practice will now be outlined in more detail. A UE situated close to a cell border, i.e. relatively far from the base station, may create resource congestion on the downlink in a cell when streaming down a video with high resolution from the internet. The streaming video service is given a high priority in order to provide satisfactory video quality. Due to relatively "bad" radio conditions at the cell edge, the downlink scheduler in the base station has to allocate much resources to the UE to satisfy the quality demands, leaving little or no resources available for other sessions with lower priority on the downlink.

At the same time, the same UE needs a radio bearer for a best-effort based service, e.g. for sending some background traffic to the internet such as mail synch information, windows update messages, etc. This service is not delay-sensitive but is dependent on correct and complete delivery of data and therefore status reports are needed for acknowledgement of data reception. Since the uplink is more or less unproblematic, data of the best-effort service will be transferred over the radio bearer immediately and without problem which would warrant a positive status report from the data receiving base station. Assuming for example that AM RLC is employed for the best-effort radio bearer, which is typically the case due to moderate delay requirements of the best-effort service, the data transmitting RLC entity in the UE expects feedback in the form of status reports from the data receiving base station for the radio bearer.

However, due to the resource congestion in downlink, at least partly caused by the ongoing high priority video session for the UE, the downlink scheduler in the base station will not allocate any resources for status reports of the best-effort service since it belongs to a radio bearer with low priority. As a result, the UE will not get any status reports on time and repeatedly re-transmits the same data on the non-congested uplink, and the data will repeatedly be discarded by the receiving base station since it has already been delivered. When a maximum number of re-transmissions has been reached, the UE eventually tears down the radio link, causing interruption of the video service which was actually working well, and initiates re-establishment of the radio connection, which thus requires additional signaling and can take several seconds.

In the following description, the term "first radio link" is used to represent the radio link on which data is transmitted, which could be either uplink or downlink, and the term "second radio link" is used to represent an opposite radio link on which status reports are transmitted, which could be either downlink or uplink, respectively.

Figure 2:
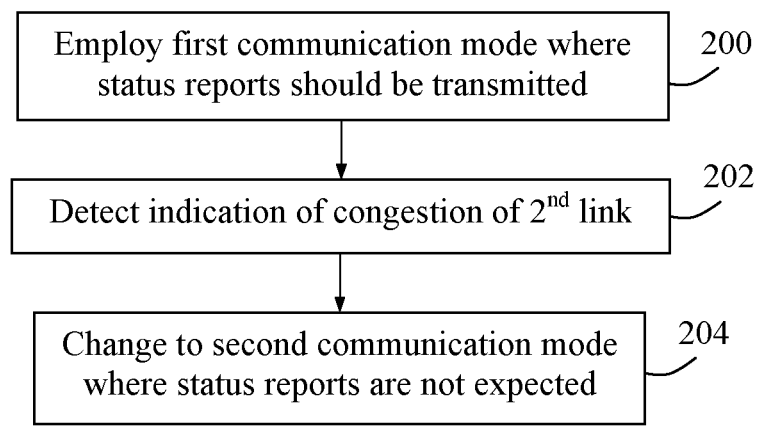
FIG. 2 is a flow chart illustrating a procedure in a base station, according to a possible embodiment.

The above problems may be generally avoided as will be outlined firstly with reference to the flow chart in FIG. 2 illustrating a procedure in a base station in communication of data with a UE on a first radio link, which could be either uplink or downlink. It is assumed that a first communication Mode is initially employed, or at least stipulated, for the communication, as shown by an action 200. The first communication Mode implies that reports on a status of the data communication should be transmitted on an opposite second radio link between the base station and the UE to indicate whether the data has been received or not. The first communication Mode may thus be the above-described AM for RLC, although the solution is not limited thereto and can be employed for any other standards or systems for controlling wireless communication of data, in the manner described here.

In this communication, the base station detects an indication of potential congestion pertaining to the second radio link used for status reporting, as shown by another action 202. An indication of potential congestion can be detected in different ways, to be exemplified further below. If such potential congestion is indicated and detected, it is possible, or even likely, that the status reports are delayed such that they will not arrive in due time at the data transmitting node, resulting in re-transmission of the same data even if the data itself was received properly. This pointless re-transmission of data can be avoided as follows.

In response to the detection of potential congestion, the base station then changes, or rather triggers or initiates a change, from the first communication Mode to a second communication Mode implying that no transmission of status reports on the second radio link is expected, as shown by a last shown action 204. Thereby, no unnecessary re-transmissions of correctly conveyed and received data due to undelivered status reports, will be made. Further, a perfectly useful radio link or connection for data communication will not be eventually torn down without cause, and it is neither necessary to establish a new connection, radio link or bearer. Throughout this description, triggering, or initiating, a change of communication Mode implies that the base station changes the communication Mode and also instructs or orders the UE to change the communication Mode as well.

In this way, much time and resources can be saved while a good performance and acceptable quality can be maintained for the service. The second communication Mode may be the above-described UM when RLC is employed, although the solution is not limited thereto. The change to the second communication Mode can be signalled from the base station to the UE in any suitable manner, e.g. by introducing a new information element "change communication Mode" in the standard signals from base stations to UEs.

Figure 3A:
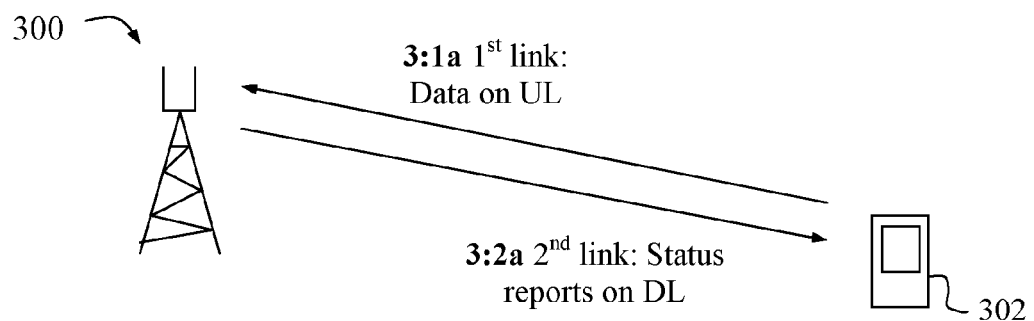
FIG. 3a illustrates a possible communication where the solution can be useful when data is transmitted on an uplink connection and corresponding status reports are transmitted on a downlink connection.
Figure 3B:
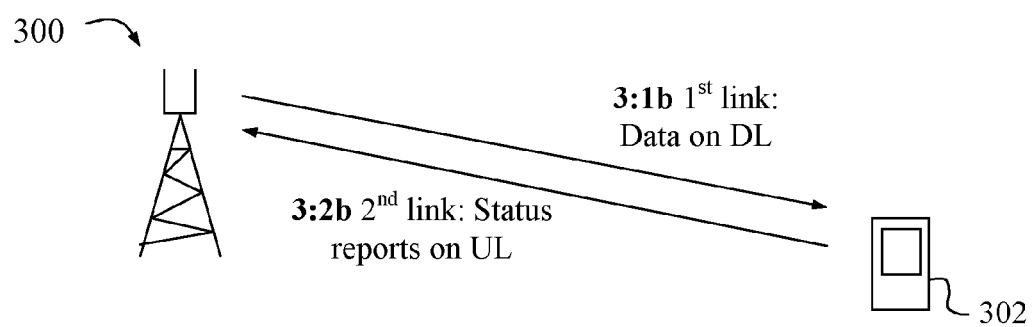
FIG. 3b illustrates another possible communication where the solution can be useful when data is transmitted on a downlink connection and corresponding status reports are transmitted on an uplink connection.

FIGS. 3a and 3b illustrate examples where the above solution can be useful. In FIG. 3a, the first radio link is an uplink (UL) connection for transmitting data from a UE 302 to a base station 300, as shown by an action 3:1a. When the first communication Mode is employed, related status reports should be transmitted on the second radio link being a downlink (DL) connection, as shown by another action 3:2a. If it is detected that congestion on the downlink is indicated, the base station triggers or initiates a change to the second communication Mode thus implying that no transmission of status reports on the second radio link is expected.

FIG. 3b illustrates another example where the communication of FIG. 3a is basically reversed such that the first radio link is a downlink (DL) connection for transmitting data from the base station 300 to the UE 302, as shown by an action 3:1b. When the first communication Mode is employed, related status reports are transmitted on the second radio link being an uplink (UL) connection, as shown by another action 3:2b. If it is detected that congestion on the uplink is indicated, the base station triggers or initiates a change to the above second communication Mode.

An example of a communication between a UE and a base station when the solution is used, will now be described with reference to the signalling diagram in FIG. 4. In this example, the UE 402 transmits data on the uplink, being the first link, to the base station 400, which is shown in a first action 4:1. It is assumed that the first communication Mode is employed implying that reports on a status of the data communication should be transmitted on the downlink, which is shown in a next action 4.2.

Further data is then transmitted from the UE 402 in a next shown action 4.3 which is properly received by the base station 400. However, for whatever reason, the UE does not receive any status report for the latest data and therefore re-transmits the same data in a following action 4.4. This is repeated as long as the UE does not receive any status report, as schematically indicated by the small dotted line. Eventually, the UE 402 may send a request for re-establishment of radio link, indicated by an optional action 4:5, assuming that the current one is no good for conveying data.

Instead of entering the time-consuming and resource demanding re-establishment process, the base station detects an indication of congestion on the second link being a potential cause for undelivered status reports, in an action 4:6. In this particular example, this congestion indication may be the multiple retransmissions of data received from the UE 402 despite that this data was properly received in action 4:3 above. Alternatively or additionally, the congestion indication may be the re-establishment request if received in action 4:5.

In either case, the base station 400 triggers or initiates a change from the first communication Mode to a second communication Mode, implying that no transmission of status reports on the second radio link is expected, in response to the detection of the congestion indication, by sending a suitable notification or command to the UE to use the second mode, in a following action 4:7. Thereafter, the UE sends data in the ongoing communication, as long as there is data to send, which is schematically indicated by multiple actions 4:8, without expecting status reports. No unnecessary re-transmissions will thus be made and no unnecessary re-establishment of radio link will be made either.

As mentioned above, the indication of congestion on the second radio link can be detected in several different ways, depending on the current situation and the implementation of this solution, which are exemplified by means of the flow charts in FIGS. 5a, 5b-8. These examples will now be briefly outlined with reference to these figures.

Figure 5B:
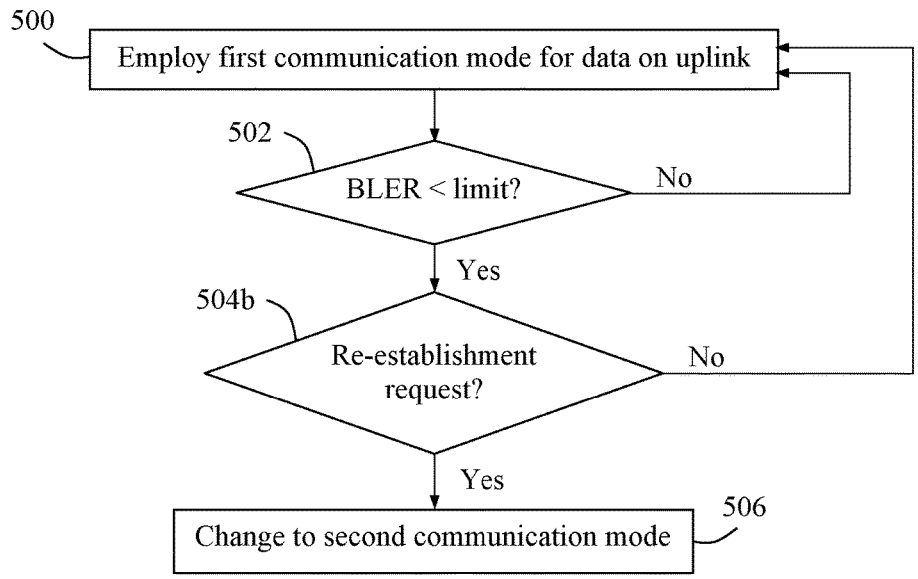

In both examples of FIGS. 5a and 5b, the above-described first communication Mode is employed for transmission of data from a UE to a base station on the uplink being the first radio link, as shown in an action 500, such that corresponding status reports are expected from the base station to the UE on the downlink being the second radio link, as also illustrated in FIG. 3a. In the examples of FIGS. 5a and 5b, a Block Error Rate (BLER) is available at the base station basically indicating the quality of the radio link used for the status reports, i.e. the second radio link. The BLER may be obtained from at least one ongoing HARQ process at the MAC layer, which HARQ process is a mechanism for monitoring the amount of errors in received data at the report receiving node, in this case the UE.

The base station then checks if the BLER measured on the downlink, i.e. the second radio link according to the above terminology, is below a certain limit, in an action 502 which is also common for FIGS. 5a and 5b. If the BLER is below the limit, it can be assumed that information can be conveyed and received properly and it is likely that the second radio link is good enough to convey the status reports. On the other hand, if the BLER on the downlink reaches or exceeds the limit, there is a potential risk that the status reports cannot be conveyed properly to the receiving UE due to bad radio link and re-establishment of the connection may become necessary. In that case, it is better to keep the first communication mode and thus return to action 500.

The next action differs in FIGS. 5a and 5b, and is therefore denoted 504a and 504b, respectively. In FIG. 5a, if the BLER on the downlink is found to be below the limit in action 502, the base station further checks if any status reports are scheduled for the UE on the downlink during a certain time period, in another action 504a. If so, the base station can be assumed to have ample opportunity to convey status reports on time to the UE before re-transmission is triggered, and it is therefore possible to keep the first communication mode and thus return to action 500. On the other hand, if no status reports are scheduled for the UE on the downlink during the time period, this can be taken as an indication that the downlink is congested. Therefore, the base station triggers or initiates a change to the second communication mode in an action 506, since no status reports are likely to reach the UE on time anyway in this case.

In the example of FIG. 5b, after determining in action 502 that the BLER on the downlink is below the limit, the base station further checks if the UE has made a request for re-establishment of the connection, in action 504b. If so, this can be taken as an indication that the downlink is congested since this request is most likely the result of delayed or absent status reports caused by congestion rather than by a bad radio link which already has been determined to be good based on the low BLER in action 502. In that case, the base station triggers or initiates a change to the second communication mode in action 506, while if the UE has not made a re-establishment request it is possible to keep the first communication mode and thus return to action 500.

Figure 6:
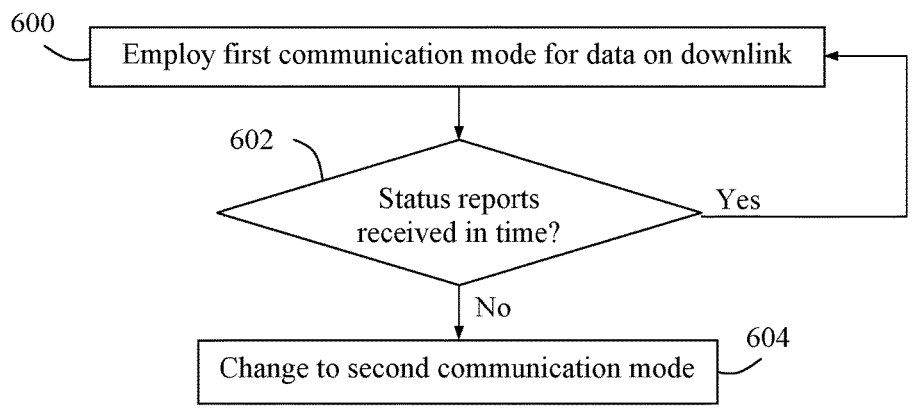
Figure 7:
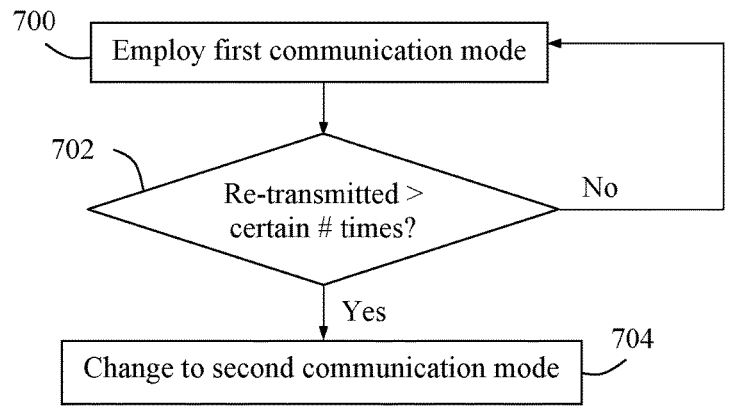

The example illustrated in FIG. 6 refers to a case when the first radio link is used for downlink transmission of data from the base station to the UE and the second radio link is used for uplink transmission of corresponding status reports from the UE to the base station. The above-described first communication Mode is initially employed for transmission of the data on the downlink, as shown in an action 600, such that corresponding status reports are expected on the uplink, as also illustrated in FIG. 3b.

The base station then checks, in an action 602, whether status reports are received on time from the UE. If so, the first communication Mode can be maintained and the process can return to action 600. If it is found in action 602 that status reports are not received on time from the UE, the base station triggers or initiates a change to the second communication Mode in action 604 since the lack of status reports on time can be taken as an indication that the second radio link on the uplink is congested. Thus, the congestion indication is detected in this example when no status reports are received from the UE on the second radio link in due time. To perform the check in action 602, a timer may be started when sending data to the UE that triggers status reporting, and the congestion indication can be detected when the timer expires before receiving any status reports from the UE.

The example illustrated in FIG. 6 refers to a case when the first radio link for transmission of data can be either uplink or downlink while the opposite second radio link is used for transmission of corresponding status reports. As in the previous examples, the first communication Mode is initially employed for transmission of the data on the first radio link, as shown in an action 700, such that corresponding status reports are expected on the second radio link.

The base station then checks, in an action 702, whether the same data has been re-transmitted on the first radio link more than a certain number of times. If not, the first communication Mode can be maintained for the time being and the process returns to action 700. However, if it is found in action 702 that the same data has been re-transmitted on the first radio link more than the above number of times, it can be assumed that no corresponding status reports have arrived on time at the data transmitting node, which has triggered the re-transmissions. The base station therefore triggers or initiates a change to the second communication Mode in an action 704. Thus, the congestion indication is detected in this example when data has been re-transmitted on the first radio link more than a certain number of times.

Figure 8:
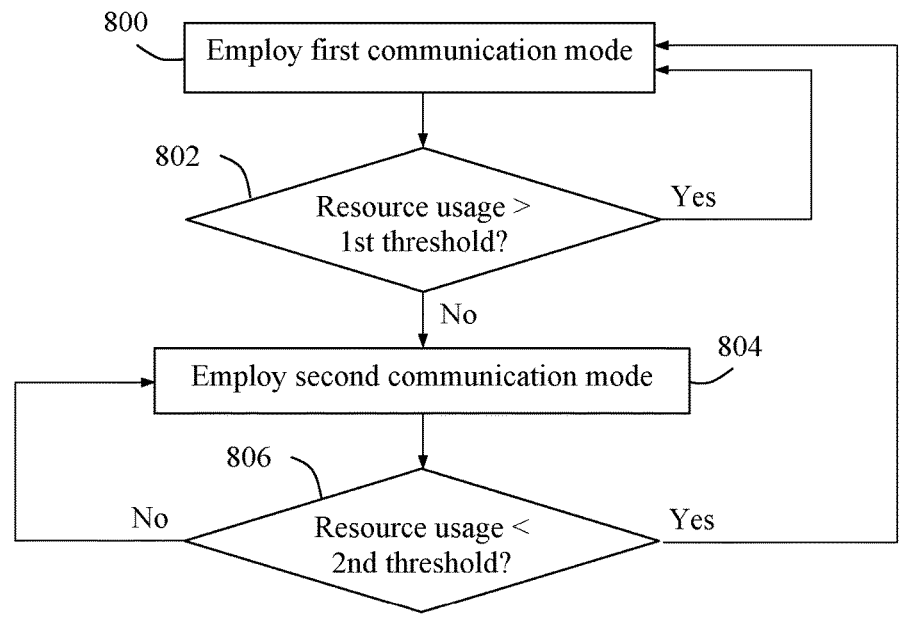

In the next example illustrated in FIG. 8, the base station detects the congestion indication by checking usage of radio resources for radio bearers on the second radio link. A high resource usage generally implies a potentially congested situation, and vice versa. The resources checked in this context may include, without limitation, various hardware components in the base station as well as bandwidth, available channels, and so forth. As in the previous examples, the first communication Mode is initially employed for transmission of the data on the first radio link, as shown in an action 800, such that corresponding status reports are expected on the second radio link.

The base station then checks, in an action 802, whether the current level of resource usage exceeds a first threshold. If not, the first communication Mode can be maintained for the time being and the process returns to action 800. However, if it is found in action 802 that the first threshold is exceeded, there is a potential risk that the status reports cannot be delivered on time, if at all, due to the high resource usage, and the base station therefore triggers or initiates a change to the second communication Mode in an action 804. Thus, the congestion indication is detected in this example when the level of resource usage for one or more radio bearers on the second radio link exceeds the first threshold.

The resource usage may however change over time, e.g. depending on the traffic load in the cell, and the base station may therefore continue monitoring the resource usage to see if the second communication Mode is still warranted. When the second communication Mode is employed, the base station may thus further check in an action 806 whether the current level of resource usage falls below a second threshold which is lower than the first threshold. If not, the second communication Mode can be maintained for the time being and the process returns to action 804. However, if it is found in action 806 that the level of resource usage falls below the second threshold, the risk that the status reports cannot be delivered on time should be reduced or even eliminated such that the first communication Mode can be employed again. Hence, the process may in that case return to action 800.

The above first and second thresholds may be "tuned" to avoid too frequent changes between the first and second communication Modes and also to avoid unnecessary re-transmissions of data and/or re-establishment of radio link due to undelivered status reports.

The examples of FIGS. 5a, 5b-8 may thus be used as trigger conditions for changing from the first communication Mode to the second communication Mode by monitoring various parameters such as the BLER of the first radio link, scheduling and reception of status reports, reception of re-establishment requests, number of re-transmissions, and resource usage. It should be noted that the above-described examples of detecting an indication of congestion on the second radio link may be combined such that more than one of these trigger conditions may be applied at the same time and several of the above parameters can be monitored at the same time, whenever suitable. Further, in the examples above it is assumed that the first communication Mode is initially used for a while before the second communication Mode is selected. It is also possible that the second communication Mode may be selected at radio bearer setup for a new wireless communication of data.

Figure 9:
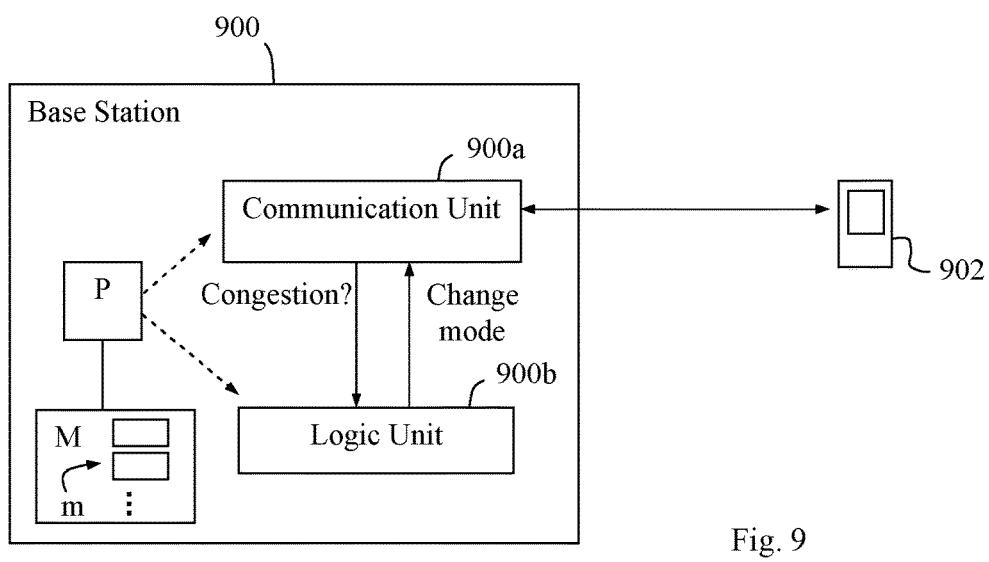
FIG. 9 is a block diagram illustrating a base station in more detail, according to further possible embodiments.

A detailed but non-limiting example of how a base station can be configured to accomplish the above-described solution, is illustrated by the block diagram in FIG. 9. The base station 900 is configured to control wireless communication of data on a first radio link between the base station and a UE, e.g. according to the procedures described above for any of FIGS. 2-8, respectively. The base station 900 will now be described in terms of a possible example of employing the solution. It is assumed that a first communication Mode is first employed, implying that reports on a status of the data communication should be transmitted on an opposite second radio link between the base station and the UE to indicate whether the data has been received or not.

The base station 900 comprises a communication unit 900a adapted to communicate data and status reports with the UE according to the first communication Mode and according to a second communication Mode implying that no transmission of status reports on the second radio link is expected. The base station 900 further comprises a logic unit 900b adapted to detect an indication of potential congestion pertaining to the second radio link. The logic unit 900b is also adapted to instruct the communication unit 900a to change from the first communication Mode to the second communication Mode, in response to the above detection of the congestion indication.

The above base station 900 and its functional units 900a-b may be configured or adapted to operate according to various optional embodiments. For example, when the first radio link is used for uplink transmission of data from the UE to the base station and the second radio link is used for downlink transmission of status reports from the base station to the UE, the logic unit 900b may be adapted to detect the congestion indication when a BLER on the second radio link is below a limit and when no status reports have been scheduled for the UE on the downlink during a certain time period or the UE has made a link re-establishment request. The BLER may be obtained from at least one HARQ process.

In another example, when the first radio link is used for downlink transmission of data from the base station to the UE and the second radio link is used for uplink transmission of status reports from the UE to the base station, the logic unit 900b may be adapted to detect the congestion indication when no status reports are received from the UE on the second radio link in due time. In this case, the logic unit 900b may be further adapted to start a timer when data that triggers status reporting is sent, and to detect the congestion indication when the timer expires before receiving any status reports from the UE.

The logic unit 900b may detect the congestion indication in further different ways. In one possible example, the logic unit 900b is adapted to detect the congestion indication when data has been re-transmitted on the first radio link more than a certain number of times. In another possible example, the logic unit 900b is adapted to detect the congestion indication when the level of resource usage for one or more radio bearers on the second radio link exceeds a first threshold. In that case, the logic unit 900b may be further adapted to change the second communication Mode back to the first communication Mode when the level of resource usage falls below a second threshold being lower than the first threshold.

It should be noted that FIG. 9 illustrates various functional units in the base station 900 and the skilled person is able to implement these functional units in practice using suitable software and hardware means. Thus, this aspect of the solution is generally not limited to the shown structures of the base station 900, and the functional units 900a-b may be configured to operate according to any of the features described in this disclosure, where appropriate.

The functional units 900a-b described above can be implemented in the base station 900 by means of program modules of a respective computer program comprising code means which, when run by a processor "P" causes the base station 900 to perform the above-described actions. The processor P may comprise a single Central Processing Unit (CPU), or could comprise two or more processing units. For example, the processor P may include a general purpose microprocessor, an instruction set processor and/or related chips sets and/or a special purpose microprocessor such as an Application Specific Integrated Circuit (ASIC). The processor P may also comprise a storage for caching purposes.

Each computer program may be carried by a computer program product "M" in the base station 900 in the form of a memory having a computer readable medium and being connected to the processor P. Each computer program product M or memory thus comprises a computer readable medium on which the computer program is stored e.g. in the form of computer program modules "m". For example, the memory M may be a flash memory, a Random-Access Memory (RAM), a Read-Only Memory (ROM) or an Electrically Erasable Programmable ROM (EEPROM), and the program modules m could in alternative embodiments be distributed on different computer program products in the form of memories within the base station 900.

While the solution has been described with reference to specific exemplary embodiments, the description is generally only intended to illustrate the inventive concept and should not be taken as limiting the scope of the solution. For example, the terms "base station", "user equipment", "radio link", "status report" and "congestion indication" have been used throughout this description, although any other corresponding nodes, functions, and/or parameters could also be used having the features and characteristics described here. The solution is defined by the appended claims.

The invention claimed is:

1. A method performed by a base station for controlling wireless communication of data on a first radio link between the base station and a User Equipment (UE) when a first communication mode is employed, the first communication mode implying that reports on a status of the data communication should be transmitted on an opposite second radio link between the base station and the UE to indicate whether said data has been received or not, the method comprising:
   detecting an indication of potential congestion pertaining to the second radio link, and
   changing from the first communication mode to a second communication mode implying that no transmission of status reports on the second radio link is expected, in response to said detection.

2. The method of claim 1, wherein the first radio link is used for uplink transmission of said data from the UE to the base station and the second radio link is used for downlink transmission of said status reports from the base station to the UE, and wherein said congestion indication is detected when a block error rate (BLER) on the second radio link is below a limit and when no status reports have been scheduled for the UE on the downlink during a certain time period or the UE has made a link re-establishment request.

3. The method of claim 2, wherein the BLER is obtained from at least one HARQ process.

4. The method of claim 1, wherein the first radio link is used for downlink transmission of said data from the base station to the UE and the second radio link is used for uplink transmission of said status reports from the UE to the base station, and wherein said congestion indication is detected when no status reports are received from the UE on the second radio link in due time.

5. The method of claim 4, wherein a timer is started when sending data that triggers status reporting and said congestion indication is detected when the timer expires before receiving any status reports from the UE.

6. The method of claim 1, wherein said congestion indication is detected when data has been re-transmitted on the first radio link more than a certain number of times.

7. The method of claim 1, wherein said congestion indication is detected when the level of resource usage for one or more radio bearers on the second radio link exceeds a first threshold.

8. The method of claim 7, wherein the second communication mode is changed back to the first communication mode when said level of resource usage falls below a second threshold being lower than the first threshold.

9. The method of claim 1, wherein the second communication mode is selected at radio bearer setup for a new wireless communication of data.

10. A base station configured to control wireless communication of data on a first radio link between the base station and a User Equipment (UE) when a first communication mode is employed, the first communication mode implying that reports on a status of the data communication should be transmitted on an opposite second radio link between the base station and the UE to indicate whether said data has been received or not, comprising:
   a communication unit adapted to communicate data and status reports with the UE according to the first communication mode and according to a second communication mode implying that no transmission of status reports on the second radio link is expected, and
   a logic unit adapted to detect an indication of potential congestion pertaining to the second radio link, and further adapted to instruct the communication unit to trigger or initiate a change from the first communication mode to the second communication mode, in response to said detection.

11. The base station of claim 10, wherein the first radio link is used for uplink transmission of said data from the UE to the base station and the second radio link is used for downlink transmission of said status reports from the base station to the UE, and wherein the logic unit is further adapted to detect said congestion indication when a block error rate (BLER) on the second radio link is below a limit and when no status reports have been scheduled for the UE on the downlink during a certain time period or the UE has made a link re-establishment request.

12. The base station of claim 11, wherein the BLER is obtained from at least one HARQ process.

13. The base station of claim 10, wherein the first radio link is used for downlink transmission of said data from the base station to the UE and the second radio link is used for uplink transmission of said status reports from the UE to the base station, and wherein the logic unit is further adapted to detect said congestion indication when no status reports are received from the UE on the second radio link in due time.

14. The base station of claim 13, wherein the logic unit is further adapted to start a timer when data that triggers status reporting is sent, and to detect said congestion indication when the timer expires before receiving any status reports from the UE.

15. The base station of claim 10, wherein the logic unit is further adapted to detect said congestion indication when data has been re-transmitted on the first radio link more than a certain number of times.

16. The base station of claim 10, wherein the logic unit is further adapted to detect said congestion indication when the level of resource usage for one or more radio bearers on the second radio link exceeds a first threshold.

17. The base station of claim 16, wherein the logic unit is further adapted to change the second communication mode back to the first communication mode when said level of resource usage falls below a second threshold being lower than the first threshold.

18. The base station of claim 10, wherein the second communication mode is selected at radio bearer setup for a new wireless communication of data.

\* \* \* \* \*